(12) United States Patent
Cordeiro (10) Patent No.: US 9,531,490 B2
(45) Date of Patent: Dec. 27, 2016

(54) METHOD AND SYSTEMS FOR SYNCHRONIZING OVERLAPPING WIRELESS SYSTEMS

(75) Inventor: Carlos Cordeiro, White Plains, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1115 days.

(21) Appl. No.: 12/160,442

(22) PCT Filed: Jan. 12, 2007

(86) PCT No.: PCT/IB2007/050106
§ 371 (c)(1),
(2), (4) Date: Jul. 10, 2008

(87) PCT Pub. No.: WO2007/083257
PCT Pub. Date: Jul. 26, 2007

(65) Prior Publication Data
US 2010/0226358 A1    Sep. 9, 2010

Related U.S. Application Data

(60) Provisional application No. 60/816,201, filed on Jun. 23, 2006, provisional application No. 60/759,520, filed on Jan. 17, 2006.

(51) Int. Cl.
*H04J 3/06*  (2006.01)
*H04W 72/08* (2009.01)
(Continued)

(52) U.S. Cl.
CPC ............ *H04J 3/0602* (2013.01); *H04J 3/06* (2013.01); *H04J 3/0638* (2013.01);
(Continued)

(58) Field of Classification Search
CPC ...... H04L 7/0016; H04L 7/0083; H04L 7/027; H04L 3/0602; H04L 3/0638; H04L 3/06
(Continued)

(56) References Cited

U.S. PATENT DOCUMENTS 7,333,814 B2 *   2/2008  Roberts ................. 455/452.2
2002/0187749 A1 * 12/2002  Beasley et al. .......... 455/41
(Continued)

FOREIGN PATENT DOCUMENTS

EP       1355450 A1    10/2003
WO    WO03047174 A1     6/2003
(Continued)

OTHER PUBLICATIONS

C. Stevenson, "Functional Requirements for the 802.22 WRAN Standard," IEEE 802.22 contrib., doc. IEEE 802.22-05-0071r39, Aug. 2005.*
(Continued)

*Primary Examiner* — Omer S Mian
(74) *Attorney, Agent, or Firm* — Larry Liberchuk (57) ABSTRACT

Methods and devices for synchronizing various independent wireless systems are disclosed. For example, an exemplary first base-station (120) capable of communicating with a first set of remote customer devices using a first wireless protocol and a first spectrum is configured to co-exist with a remote base-station capable of communicating with a second set of remote customer devices using the first wireless protocol and the first spectrum. The first base-station includes a physical layer (PHY) device (250) configured to transmit and receive wireless signals of the first protocol and the first spectrum, a suppression device (240) coupled to the PHY device, and a media access control (MAC) device (230) coupled to the PHY device configured to receive the remote set of wireless signals from the PHY device.

12 Claims, 5 Drawing Sheets

(51) Int. Cl.
   *H04W 16/14*     (2009.01)
   *H04W 84/12*     (2009.01)
(52) U.S. Cl.
   CPC .......... *H04W 72/082* (2013.01); *H04W 16/14* (2013.01); *H04W 84/12* (2013.01)
(58) Field of Classification Search
   USPC ........................................................ 370/465
   See application file for complete search history.

(56) References Cited

U.S. PATENT DOCUMENTS

| | | | |
|---|---|---|---|
| 2003/0123420 A1* | 7/2003 | Sherlock | H04W 24/00 370/338 |
| 2004/0053621 A1* | 3/2004 | Sugaya | 455/450 |
| 2005/0054294 A1 | 3/2005 | Khun-Jush | |
| 2005/0096033 A1* | 5/2005 | Miyawaki et al. | 455/422.1 |
| 2006/0252416 A1* | 11/2006 | Du et al. | 455/422.1 |
| 2007/0147322 A1* | 6/2007 | Agrawal et al. | 370/338 |
| 2008/0019343 A1* | 1/2008 | Benveniste | 370/338 |

FOREIGN PATENT DOCUMENTS

| | | |
|---|---|---|
| WO | WO03077064 A2 | 9/2003 |
| WO | WO2004057894 A1 | 7/2004 |
| WO | WO2007031960 A2 | 3/2007 |

OTHER PUBLICATIONS

"Functional Requirements for the 802.22 WRAN Standard", Internet Citation, Aug. 2005, XP002325031, Retrieved from the Internet: URL:www.ieee802.org/22/Meeting_documents/2005_Aug_teleconferences/22-05-0007-39-0000_RAN_Requirements.docs.

Carlos Cordeiro et al., "A Cognitive PHY/MAC Proposal for IEEE 802.22 WRAN Systems", IEEE P802.22 Wireless RANs, Nov. 2007.

Cordeiro, C. et al., A Cognitive PHY/MAC Proposal for IEEE 802.22 WRAN Systems Part 2: The Cognitive MAC (CMAC), IEEE P802.22 Wireless RANs, IEEE, Nov. 7, 2005, doc.:IEEE 802.22-05/0104r0, p. 139-150.

* cited by examiner

METHOD AND SYSTEMS FOR SYNCHRONIZING OVERLAPPING WIRELESS SYSTEMS

This disclosure pertains to the field of wireless communication networks, and more particularly to a method for improving the ability of multiple, independent wireless communication networks of the same type to work efficiently in overlapping geographical areas.

With the emergence of unlicensed wireless services, overlapping operation of multiple, possibly competing, wireless networks sharing the same frequency spectrum will become more commonplace. Together with the overall proliferation of wireless services, interference among various co-located wireless networks has become a problem hindering the development, and threatening the future, of wireless services which share the same frequency spectrum.

One aspect that undermines the coexistence of overlapping base-stations (responsible for managing the various overlapping wireless networks) is the lack of synchronization. Traditionally, synchronization among overlapping base-stations has been tackled through the backhaul. This simplifies a base-station's PHY and MAC design, but this approach too often relies on third party support, which may not be available. Another drawback is that the increasing number of technologies employing license-exempt operation effectively precludes the existence of a common backbone necessary for cooperation among competing operators serving a given location. This is further aggravated as the coverage range of these wireless technologies increase (e.g., IEEE 802.22).

Obviously, synchronization can be useful in order to allow wireless systems to both coexist and operate at improved performance. Synchronization is key to efficiency, as it allows other dynamic resource sharing schemes to be built on top of it. While synchronization may be a hard problem to be solved, the benefits gained from having it can be so significant that it is worth pursuing. Accordingly, new technology related to the synchronization of overlapping, and possibly competing, wireless communication systems is desirable.

In a first embodiment, a first base-station capable of communicating with a first set of remote customer devices using a first wireless protocol and a first spectrum, and first base-station being configured to co-exist with a remote base-station capable of communicating with a second set of remote customer devices using the first wireless protocol and the first spectrum is disclosed. The first base-station and the first set of remote customer stations include a physical layer (PHY) device configured to transmit and receive wireless signals of the first protocol and the first spectrum, a suppression device coupled to the PHY device, wherein the suppression device is configured inhibit the PHY device from transmitting while the PHY device detects a remote set of wireless signals transmitted by either the remote base-station or the second set of remote users, and a media access control (MAC) device coupled to the PHY device configured to receive the remote set of wireless signals from the PHY device, wherein the MAC device includes a timing estimation device configured to estimate the timing of the second base-station's transmitted signal based on the received wireless signals of the remote device, and wherein the MAC device is further configured to adjust its own protocol timing in a manner as to assist in decreasing signal interference amongst the first and remote base-stations, and the first and remote customer devices.

In a second embodiment, a method for assisting to lessen the interference between a first base-station capable of communicating with a first set of remote customer devices using a first wireless protocol and a first spectrum and a remote base-station configured to capable of communicating with a second set of remote customer devices using the first wireless protocol and the first spectrum is disclosed. The method includes periodically suppressing a transmission of a physical layer (PHY) device of the first base-station and first set of customer stations for a first period while detecting a remote set of wireless signals transmitted by either the remote base-station or the second set of remote users, wherein each first suppressed period lasts at least one frame period of the first wireless protocol, and adjusting the protocol timing of the first base-station based on the detected wireless signals in a manner as to assist to lessen signal interference between the first and remote base-stations.

In a third embodiment, a first base-station capable of communicating with a first set of remote customer devices using a first wireless protocol and a first spectrum, and first base-station being configured to co-exist with a remote base-station capable of communicating with a second set of remote customer devices using the first wireless protocol and the first spectrum is disclosed. The first base-station and the first set of remote customer stations include a physical layer (PHY) device configured to transmit and receive wireless signals of the first protocol and the first spectrum, and a protocol control means for adjusting the protocol timing of the first base-station and the first set of remote customer stations in a manner as to assist to lessen signal interference amongst the first and remote base-stations, and first and second customer devices, based on the detected remote set of wireless signals, wherein the protocol control means adjusts protocol timing based on intermittently detected wireless signals transmitted by either the remote base-station or the second set of remote users and detected by the PHY device.

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the example embodiments. Such methods and apparatus are clearly within the scope of the present teachings.

Figure 1:
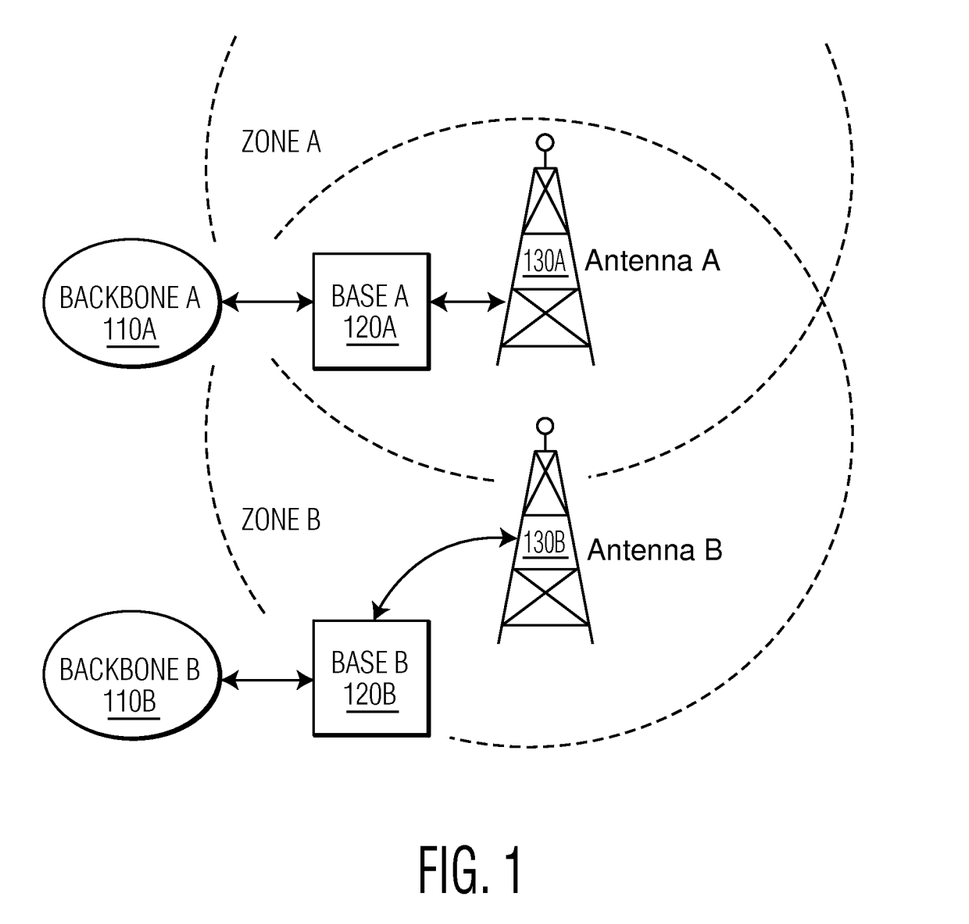
FIG. 1 depicts two wireless communications systems having overlapping operational regions.

FIG. 1 depicts two overlapping wireless communications systems, A and B, having overlapping operational regions, ZONE A and ZONE B. As shown in FIG. 1, communication system A includes a first base-station 120A having an antenna 130A with the first base-station 120A being coupled to a supporting communications backbone/network 110A. Similarly, communication system B includes a second base-station 120B having an antenna 130B with the second base-station 120B being coupled to a second supporting communications backbone/network 110B. As is depicted by FIG. 1, the exemplary communications backbones 110A and 110B have no common wired infrastructure that can be used to enable the first base-station 120A to synchronize with the second base-station 120B. Note, however, that the various methods and systems of the present description may be applied regardless of whether such a common backbone is available or not.

In operation, the first base-station 120A can communicate with a variety of customer devices (e.g., mobile computers or specialized Customer Premise Equipment (CPE)) residing in ZONE A using, for example, a wireless Time Division Multiple Access (TDMA) protocol (e.g., IEEE 802.22) with the protocol having a generally continuous series of frames with each frame divided into various downstream and upstream slots. Similarly, the second base-station 120B can communicate with a second set of customer devices residing in ZONE B using the same TDMA protocol (and same frequency spectrum) as the first base-station 120A. Given the extent of geographic and spectral overlap of ZONE A and ZONE B, it is apparent that the transmissions from the two base-stations 120A and 120B and associated customer devices can interfere with one another to the detriment of all. Accordingly, the overlapping wireless communications systems A and B may both benefit by cooperating when such cooperation comes at little or no detriment to either.

In the present embodiment, the competing communications systems A and B can cooperate by monitoring one another's wireless emissions, and modifying various aspects of their own wireless emissions in ways that can reduce mutual interference based on the monitored emissions. For example, by monitoring communications system B, the first communications system A can derive the protocol timing of communications system B and adjust its own protocol timing in a way to minimize mutual interference.

For the purpose of this disclosure, the term "protocol timing" as it relates to a wireless signal can refer to the times at which frame boundaries and (in some cases) superframe and/or slot boundaries are occurring and should continue to periodically occur. Protocol timing may also include the timing related to special signaling bits/bytes/words, the expected timing of upstream versus downstream packet transmission, the timing of special purpose communications windows and so on.

Returning to FIG. 1, it should be appreciated that better cooperation may also be had if the communications protocols for the wireless communications systems A and B could be designed for passing useful information and commands between the wireless communications systems A and B. Still yet, cooperation may be improved if the various customer devices could likewise pass useful information and commands between the wireless communications systems A and B. For the purpose of this disclosure, such cooperative information and commands can be referred to as aspects of a "Coexistence Beacon Protocol" (CBP). Further information about CBPs, as well competing wireless systems in general, can be found in "A Cognitive PHY/MAC Proposal for IEEE 802.22 WRAN Systems" (November 2005) Document No. IEEE 802.22-05/0105r0 by Carlos Cordeiro, as well as U.S. Patent Application No. 60/733,518, both herein incorporated by reference in their entirety.

Figure 2:
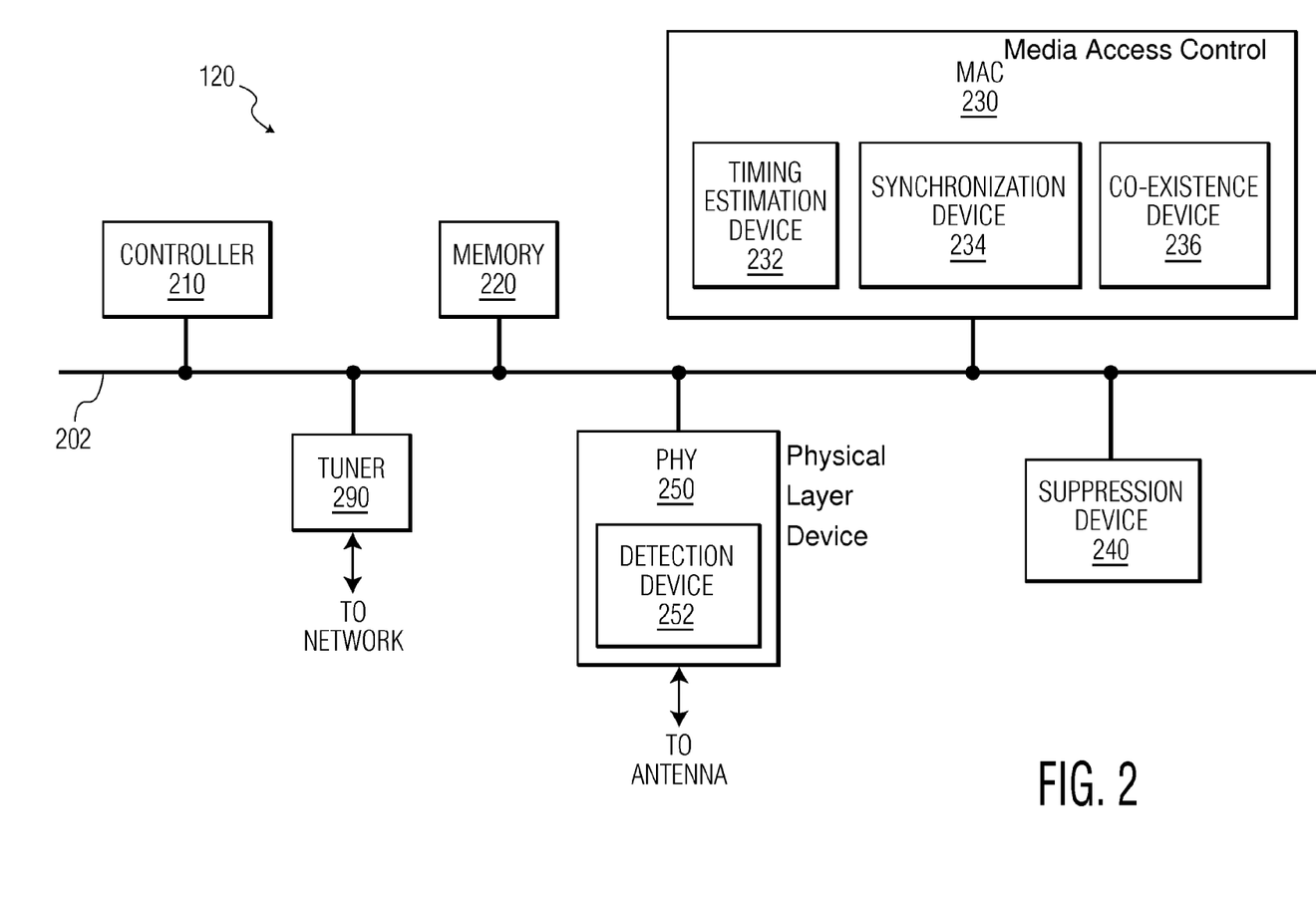
FIG. 2 shows a block diagram of an exemplary base-station configured to better co-exist with a competing base-station.

FIG. 2 shows a block diagram of an exemplary base-station 120 configured to better co-exist with a competing base-station by employing advantageous detection, message-passing and synchronization techniques. As shown in FIG. 2, the exemplary base-station 120 includes a controller 210, a memory 220, a media access controller (MAC) device 230, a suppression device 240, a physical layer (PHY) device 250 and an input/output device 290. The MAC 230 includes a timing estimation device 232, a synchronization device 234 and a co-existence device 236. The PHY 250 includes a detection device 252 and has a link capable of coupling to an antenna (not shown). The input/output device 290 can be coupled to a communication backbone via any number of technologies Although the exemplary base-station 120 of FIG. 2 uses a bussed architecture, it should be appreciated that any other architecture may be used as may be known to those of ordinary skill in the art. For example, in various embodiments, the various components 210-290 can take the form of separate electronic components coupled together via a series of separate busses or a collection of dedicated logic arranged in a highly specialized architecture.

It also should be appreciated that some of the above-listed components 230-290 can take the form of software/firmware routines residing in memory 220 and be capable of being executed by the controller 210, or even software/firmware routines residing in separate memories in separate servers/computers being executed by different controllers.

Still further, it should also be appreciated that various remote customer devices may possess similar components with similar functionality to those components 210-290 shown in FIG. 2 and described herein with the caveat that such components on a remote customer device may not need to possess the same complexity as the components 210-290 the base-station 120 and so some of the components in FIG. 2 can be omitted (e.g., the synchronization device 234).

Returning to FIG. 2, before the exemplary base-station 120 starts its "regular" operation, i.e., it provides continuous communication services for its various customer devices, the base-station 120 can initiate a quiet "listening" period for itself, for related customer devices and possibly for all other base-stations that might be affected.

During this initial quiet period, the suppression device 240 can prevent the PHY 250 from transmitting while permitting the PHY 250 to passively "listen" for other wireless systems that may be already actively providing communication services. The exemplary PHY 250 uses its detection device 252 to detect external communication services using the same protocol and frequency spectrum intended for use by the base-station 120 of FIG. 2. As these signals are detected, they are converted into a digital data stream, which is in turn provided to the timing estimation device 232 in the MAC 230.

Once the data stream is received, the timing estimation device 232 can use the data stream to determine the protocol timing of the external wireless signals.

In case of the base-station 120, after the timing estimation device 232 has estimated the protocol timing of the detected wireless signals, the synchronization device 234 can cause the MAC 230 to adjust its own protocol timing in such a way as to assist to lessen or minimize potential interference between any wireless signals produced by the base-station 120 and the wireless signals produced by the remote base-station. In case of a first remote customer device, the resulting timing of the external wireless signal may be communicated to the first base-station 120 who can, in turn, proceed as described before.

In certain embodiments, such synchronization may simply consist of aligning the start of frame boundaries to coincide with the start of the frame boundaries produced by the detected remote base-station. This embodiment does not require that any respective local and remote frames be aligned (e.g., frame 1 to frame 1, frame 2 to frame 2 and so on), merely that frame boundaries be aligned.

In other embodiment, however, it can be useful to align respective frames, superframes, sets of superframes and so on. By aligning superframes, it is assumed that frame boundaries can be aligned, as well as frames (i.e., frame 1 to frame 1, frame 2 to frame 2 and so on), slot boundaries, special signaling bits, etc.

While the base-station 120 of the present embodiment is capable of executing the above-described initial quiet/alignment period, it should be appreciated that even should the MAC 230 initially produce a perfectly aligned signal protocol with respect to the remote base-station protocol, clock drift and other system imperfections can cause local and remote frame boundaries to drift relative to one another over time. In addition, other wireless systems may start operation using the same resources and in overlapping geographical locations.

In order to counteract these cases, the base-station 120 can further employ periodic intermittent quiet listening periods in order to realign local and remote protocol timing.

These periodic intermittent quiet listening periods, also referred to as "self-coexistence quiet periods", need not be frequent, and while the base-station can have complete freedom to choose their occurrence and frequency, it can be beneficial to regularly schedule the self-coexistence quiet periods in every superframe, and done in a random way to increase the probability that overlapping base-stations and/or remote customer devices successfully detect each other. The duration of a quiet period can typically be of less than one frame size, but can also be of one frame, and possibly of multiple frames.

Figure 3:
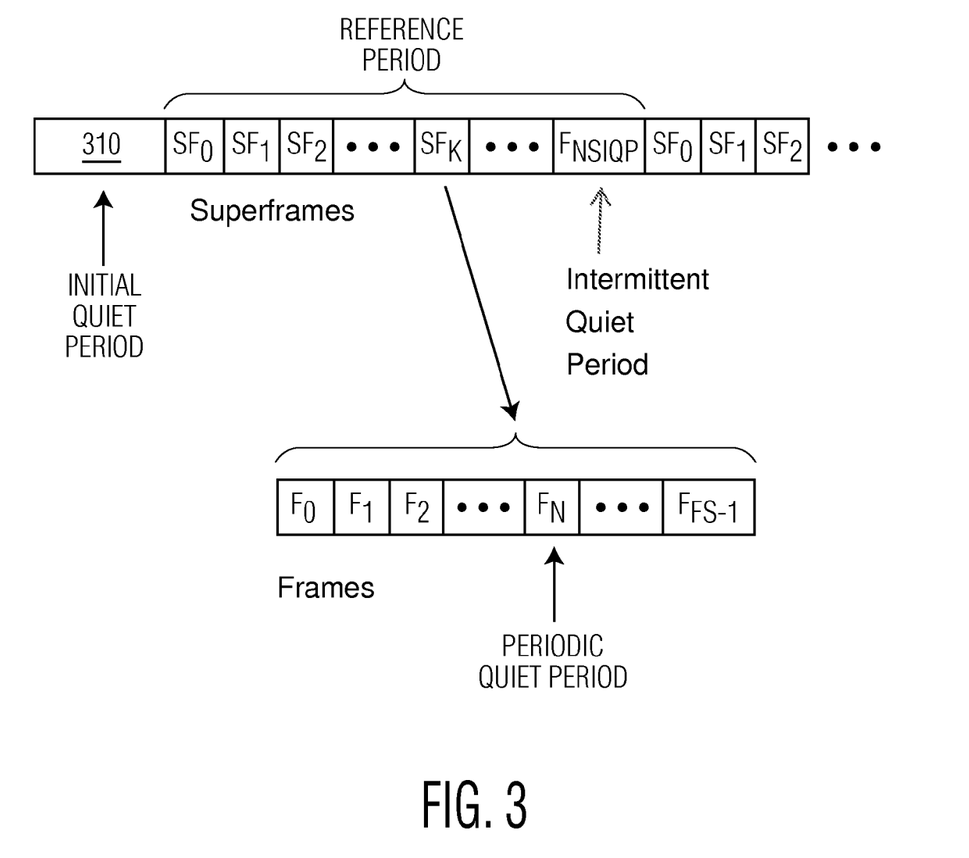
FIG. 3 depicts both an initial and periodic "quiet period" useful for the detection of an overlapping wireless system.

FIG. 3 depicts such an exemplary wireless transmitted signal having a randomly/pseudo-randomly generated self-coexistence quiet time selection along with an initial quiet time as described above. As shown in FIG. 3, the protocol of the example wireless signal has an initial quiet time 330 followed by a repeating set of superframes $SF_0 \ldots SF_{NS-1}$, where NS defines the number of superframes in a set. Also shown in FIG. 3, each superframe $SF_0 \ldots SF_{NS-1}$ can have a predetermined set of frames $F_0 \ldots SF_{FS-1}$, where FS defines the number of frames in a superframe. For the present example, frame $F_N$ of superfame $SF_K$ has been randomly selected such that an intermittent quiet period will occur every NS×FS frame periods.

During each quiet frame $F_N$, the suppression device 240 can suppress PHY transmission while allowing the detection device 252 to detect any remote wireless signals. Using the detected signals, the timing estimation device 252 can again estimate the protocol timing of the remote wireless signals, and the synchronization device 234 can apply a convergence routine to force the MAC to "slide" its protocol timing to be closer to (if not exactly) the protocol timing of the remote base-station.

While any number of possible convergence rules may be employed by the synchronization device, it should be appreciated that it can be desirable to limit the acceptable convergence time while guaranteeing convergence. Accordingly, a judicious choice of convergence rule(s) can be desirable to optimize performance.

Note that whenever the protocol timing of the MAC 230 is adjusted, it should be appreciated that the time for such a slide may be best if at a superfame boundary or at a set of superframes boundary. So that the timing slide does not disrupt any data communication, the MAC 230 can account for the slide when scheduling future upstream and downstream transmissions, and further strive to communicate with customer devices and other base-stations to coordinate and confirm any timing adjustments made. It should also be noted that in case of a centralized access system with a base-station 120, it can be the responsibility of the base-station 120 to adjust the protocol timing, which is announced and followed by all remote customer devices.

Figure 4:
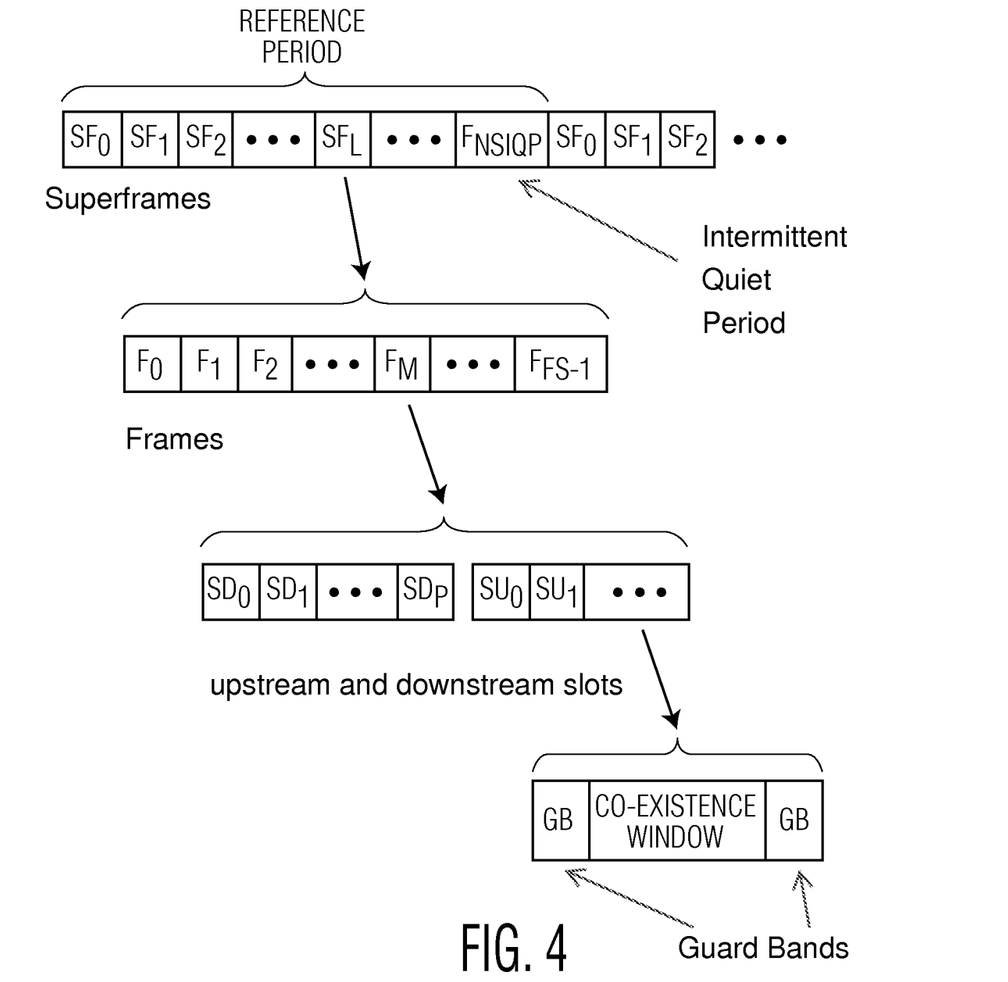
FIG. 4 depicts an exemplary co-existence window for communication amongst overlapping wireless systems.

Returning to FIG. 2, the co-existence device 236 of the MAC 230 can be used to coordinate and confirm timing adjustments by use of a "self-coexistence window". FIG. 4 depicts such an exemplary self-coexistence window as part of a number of upstream slots located at the end of frame $F_M$, superframe $SF_L$. The self-coexistence window need not be as long as a quiet window—typically a few slots with guard bands on either side to account for signal delay propagation.

The above-mentioned coordination and confirmation of time-slides/synchronization, as well as other system maintenance issues, can be accommodated through periodic packet transmissions and receptions during the self-coexistence windows. For example, after a first base-station makes a protocol timing adjustment, synchronization may be considered completed and confirmed once a first "beacon packet" is successfully received from an overlapping cell. For the purpose of this disclosure, the any packets transmitted and received using the co-existence window can fall under the "Coexistence Beacon Protocol" (CBP) discussed above, and packets transmitted under the CBP can be referred to as "beacon packets".

Figure 5:
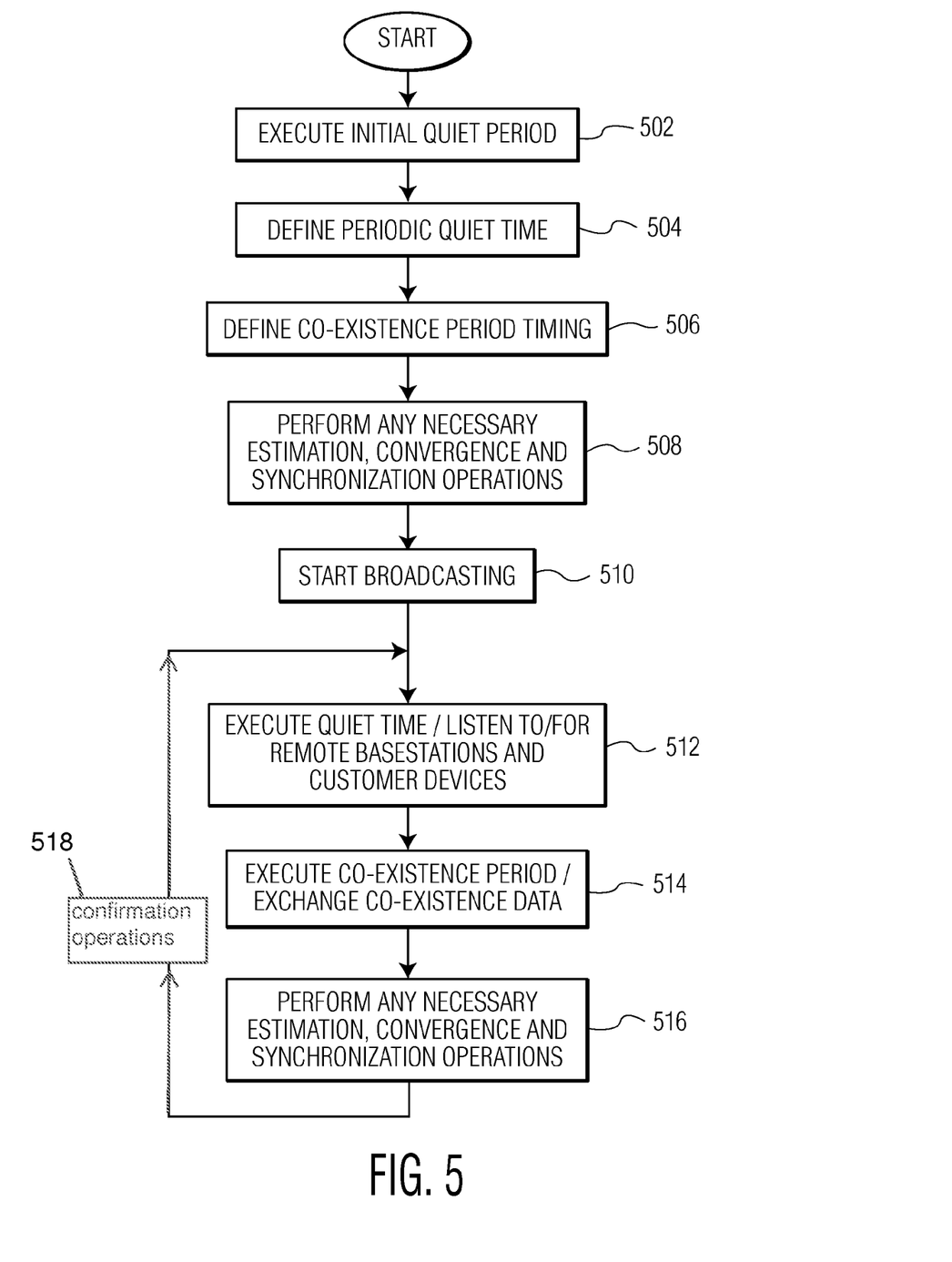
FIG. 5 is a block diagram outlining various exemplary operations directed to the improved co-existence of overlapping wireless systems.

FIG. 5 is a block diagram outlining various exemplary operations directed to the improved co-existence of competing base-stations. The process starts in step 502 when an initial quiet listening period is performed by a base-station to detect the signals produced by a remote base-station. Next, in step 504, the timing of the remote base-station's protocol is estimated, and calculations to produce the necessary synchronization of the base-station's transmitted signal is performed. Control continues to step 506.

In step 506, the timing for periodic quiet/listening frames (or other time periods) can be defined. Next, in step 508, the timing for periodic co-existence periods can be defined. Then, in step 510, the base-station can start transmitting using protocol timing as defined in step 504 and having quiet and co-existence periods as defined in steps 506 and 508. Control continues to step 512.

In step 512, a scheduled quiet time is executed, and signals from either the remote base-stations or remote customer devices can be detected. Next, in step 514, a scheduled co-existence window can be executed and any pertinent co-existence data can be exchanged. Control continues to step 516.

In step 516, any necessary timing estimation and convergence routines can be performed, as well as any synchronization operations, e.g., "sliding", necessary to align the protocol timing of a base-station to a remote base-station. Next, in step 518, confirmation operations can be performed using the CBP discussed above—typically through a subsequent co-existence window. Control then jumps back to step 512 and loops continuously through steps 512-518 as needed until the subject base-station ceases operation.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A first base-station capable of communicating with a set of first remote customer devices in a first wireless system using a first wireless protocol and a first spectrum, and the first base-station being configured to co-exist with a second wireless system, different from the first wireless system, having a second base-station capable of communicating with a set of second remote customer devices using the first wireless protocol and the first spectrum, the first base-station comprising:
   a physical layer (PHY) device configured to transmit and receive wireless signals of the first protocol and the first spectrum;
   a suppression device coupled to the PHY device, wherein the suppression device is configured to periodically inhibit the PHY device from transmitting, during a a self-coexistence window, while the PHY device detects wireless data signals transmitted by the second base-station; and
   a media access control (MAC) device coupled to the PHY device and configured to receive the wireless data signals from the PHY device,
   wherein the MAC device includes a timing estimation device configured to estimate a protocol timing exhibited by the wireless data signals transmitted from the second base-station, and
   wherein the MAC device is further configured to adjust a protocol timing for the first base-station, based on the estimated protocol timing from said timing estimation device, in order to lessen signal interference between the first base-station and the second wireless system, by aligning superframe boundaries of signals transmitted from the first base-station with superframe boundaries of the wireless data signals transmitted by the second base-station, and
   wherein the MAC device further includes a co-existence device configured to establish a common co-existence time period between the first and second base-stations in a certain frame occurring every certain number of frame periods, the certain number being a product of a total number of superframes in a repeating set of superframes following an initial quiet period and a total number of frames in each superframe, the certain frame comprising the self-coexistence window occurring during a number of upstream slots located at an end of the certain frame.

2. The first base-station of claim 1, wherein the MAC device includes a synchronization device configured to adjust the protocol timing of the first base-station in a manner as to align frame boundaries of the first base-station's transmitted signals with frame boundaries of the second base-station's transmitted signals.

3. The first base-station of claim 1, wherein the suppression device is configured to inhibit the PHY device from transmitting during the initial quiet period before regular operational transmission of the first base-station.

4. The first base-station of claim 1, wherein the first base-station assigns a random frame number for the common co-existence time period.

5. The first base-station of claim 4, wherein the first base-station further assigns a superframe number from a set of superframes comprising the first base-station's protocol to the common co-existence time period.

6. The first base-station of claim 5, wherein the first base-station assigns a random superframe number.

7. The first base-station of claim 1, wherein the common co-existence time period further is configured for exchanging messages directed to a sharing of bandwidth resources between the first and second base-stations.

8. The first base-station of claim 1, wherein the common co-existence time period includes the upstream timeslots of the certain frame and one or more guard bands.

9. A method for lessening the interference between a first base-station capable of communicating with a set of first remote customer devices in a first wireless system using a first wireless protocol and a first spectrum and a second wireless system, different from the first wireless system, having a second base-station capable of communicating with a set of second remote customer devices using the first wireless protocol and the first spectrum, the method comprising:
   periodically suppressing a transmission by a physical layer (PHY) device of the first base-station, during a self-coexistence window, while the PHY device detect wireless data signals transmitted by the second base-station;
   adjusting a protocol timing, by a media access control (MAC) device of the first base-station, by estimating the protocol timing of the wireless data signals transmitted by the second base station detected by the first base-station during the self-coexistence window in order to lessen signal interference between the first base-station and the second wireless system, said estimating producing a first estimated time, said adjusting being realized by aligning, in accordance with a time change adjustment based at least in part on said first estimated time, superframe boundaries of signals transmitted from the first base-station with superframe boundaries of the data signals transmitted by the second base-station; and establishing, by the MAC device, a periodic common co-existence time period between the first and the second base-stations in a certain frame occurring every certain number of frame periods, the certain number being a product of a total number of superframes in a repeating set of superframes following an initial quiet period and a total number of frames in each superframe, the certain frame comprising the self-coexistence window occurring during a number of upstream slots located at an end of the certain frame.

10. The method of claim 9, wherein the periodic common co-existence time period comprises one or more guard bands.

11. A first base-station capable of communicating with a set of first remote customer devices in a first wireless system using a first wireless protocol and a first spectrum, and the first base-station being configured to co-exist with a second wireless system, different from the first wireless system, having a second base-station capable of communicating with a set of second remote customer devices using the first wireless protocol and the first spectrum, the first base-station comprising:

a physical layer (PHY) device configured to transmit and receive wireless signals of the first protocol and the first spectrum; and a controller configured to periodically suppress a transmission of physical layer (PHY) device of the first base-station, during a self-coexistence window, for a first period while detecting a remote set of wireless data signals transmitted by the second base-station, and said controller further configured to adjust a protocol timing of the first base-station in order to lessen signal interference between the first base-station and the second wireless system based on the remote set of wireless data signals detected by the PHY device, wherein the controller adjusts the protocol timing of the first base-station by estimating the protocol timing of the transmitted wireless data signals from the second base-station to produce a first estimated time, said estimating based on intermittently detected wireless signals transmitted by the second wireless system detected by the first base-station during the self-coexistence window, and by aligning, in accordance with a time change adjustment based at least in part on said first estimated time, superframe boundaries of signals transmitted from the first base-station with superframe boundaries of the wireless data signals transmitted by the second base-station, and wherein the controller further establishes a periodic common co-existence time period between the first base-station and the second wireless system in a certain frame occurring every certain number of frame periods, the certain number being a product of a total number of superframes in a repeating set of superframes following an initial quiet period and a total number of frames in each superframe, the certain frame comprising the self-coexistence window occurring during a number of upstream slots located at an end of the certain frame.

12. The first base-station of claim 11, wherein the first base-station is part of an unlicensed communication system.

* * * * *